(12) United States Patent
Sondov

(10) Patent No.: US 6,216,733 B1
(45) Date of Patent: Apr. 17, 2001

(54) APPARATUS FOR THE DISTRIBUTION OF WATER OR OTHER LIQUIDS

(75) Inventor: Sten Y. Sondov, Tønsberg (NO)

(73) Assignee: Cleanpipe AS, Tonsberg (NO)

( * ) Notice: Subject to any disclaimer, the term of this patent is extended or adjusted under 35 U.S.C. 154(b) by 0 days.

(21) Appl. No.: 09/308,158

(22) PCT Filed: Nov. 11, 1997

(86) PCT No.: PCT/NO97/00299

§ 371 Date: Jul. 14, 1999

§ 102(e) Date: Jul. 14, 1999

(87) PCT Pub. No.: WO98/21420

PCT Pub. Date: May 22, 1998

(30) Foreign Application Priority Data

Nov. 15, 1996 (NO) .................................................. 4844/96

(51) Int. Cl.[7] .................................................. E03B 11/10
(52) U.S. Cl. ..................................... 137/561 A; 137/578
(58) Field of Search .............................. 137/561 A, 578

(56) References Cited

U.S. PATENT DOCUMENTS

| 1,591,453 | | 7/1926 | Heermans . | |
| 1,875,544 | * | 9/1932 | Alphonso | 137/578 X |
| 2,193,696 | * | 3/1940 | Ramsaur | 137/561 A |
| 2,518,292 | | 8/1950 | De Anglis . | |
| 3,776,269 | * | 12/1973 | Watts | 137/561 A |
| 4,015,629 | * | 4/1977 | Morgan et al. | 137/578 |
| 4,094,338 | * | 6/1978 | Bauer | 137/578 |
| 4,302,338 | * | 11/1981 | Pfohl et al. | 137/561 A X |
| 4,505,297 | * | 3/1985 | Leech, III et al. | 137/561 A |
| 5,107,892 | * | 4/1992 | Plachy | 137/561 A |
| 5,241,867 | * | 9/1993 | Cohen et al. | 137/561 A X |
| 5,407,091 | | 4/1995 | Wallis . | |

FOREIGN PATENT DOCUMENTS

| 431006 | 4/1994 | (EP) . |
| 2297769 | 8/1996 | (GB) . |
| 151051 | 10/1984 | (NO) . |
| 176976 | 7/1995 | (NO) . |
| 461407 | 2/1990 | (SE) . |

* cited by examiner

Primary Examiner—John Rivell
(74) Attorney, Agent, or Firm—Rothwell, Figg, Ernst & Manbeck

(57) ABSTRACT

An apparatus for the distribution of water or other liquids, comprising a tank with at least one inlet and two or more outlets adapted to deliver equal amounts of liquid. A float body is adapted to float on a water reservoir in the tank and is provided with a distribution basin for receiving liquid from said inlet(s). The distribution basin has a number of outlet openings corresponding to said outlets and located at the same level in the distribution basin and being adapted to discharge liquid to a separate outlet.

11 Claims, 1 Drawing Sheet

APPARATUS FOR THE DISTRIBUTION OF WATER OR OTHER LIQUIDS

BACKGROUND OF THE INVENTION

1. Field of the Invention

The present invention relates to an apparatus for the distribution of water or other liquids, comprising a tank with at least one inlet and two or more outlets adapted to deliver equal amounts of liquid.

This invention in a practical embodiment, concerns a distribution shaft or tank for water, in particular water either for infiltration in the soil or for irrigation of agricultural areas, where it is often desirable to distribute the water evenly over large areas. Normally the distribution shaft will be connected to an external water source, which distributes the water evenly to one or more outlets. After the setting up of the distribution shaft, its outlets must be adjusted with accuracy so that the water flux to the outgoing pipes/channels is distributed approximately evenly between these. This adjustment is not easy, as the outlets are usually to be found in the bottom of a narrow shaft, often two or three meters below ground level. The adjustment must be carried out, not only at the setting up of the shaft, but continually through the years because the least level difference between the lowest point of the water outlets, where water starts running out to the outlet pipes from the distribution shaft, entails large differences in the water volume from the outlet of the distribution shaft. There are distribution shafts that can be adjusted from ground level, but this is a time consuming process where one has to use tools with long handles, good lighting and adequate measuring devices. Furthermore, movable parts have a tendency to jamming, as they are exposed to influx of sludge to the areas about to be repaired.

2. Description of the Related Art

A distribution shaft or tank for infiltration, involving drawbacks as explained immediately above, is described in Norwegian patent specification No. 151,051. Also No. 176,976 shows a valve design of some interest in this connection. Other prior art, being of still less relevance, is represented by U.S. Pat. Nos. 1,591,453 and 2,518,292.

There are many reasons why distribution shafts change their position across time. It often happens because of movements in the ground by loose fillers, generally unstable masses, for example by passage of a tractor nearby. In countries where the ground is normally frozen during certain periods, this is considered to be the main reason for the necessary frequent adjustments of distribution shafts.

SUMMARY OF THE INVENTION

To overcome the existing drawbacks of distribution shafts it is therefore an objects of this invention to provide a new and improved solution which, among other things, results in automatic adjustment in a distribution tank, so that there is normally no need for later manual resetting or adjustment in order to obtain a long-term equal amount or flow of water in all outlets from the tank. According to the invention this is obtained primarily by means of a float body adapted to float on a water reservoir in the tank and provided with a distribution basin for receiving liquid from said inlet(s), said distribution basin having a number of outlet openings corresponding to said outlets and located at the same level in the distribution basin and being each adapted to discharge liquid to a separate outlet.

In other words influxed water or other liquids is distributed over a stably floating watertight body, centrally situated and equipped with a basin for reception and distribution of water.

In a practical embodiment features and functions may be included as follows: The water volume in the basin varies with the influx, and entails that the sides of the basin are kept free from possible sludge. The water then, runs down through the desired number of outlet openings (distribution holes) which can be equipped with a known type of V-overflows. Thereafter the water runs out through elbows of the outlets, which are connected with other installations. If the distribution shaft, and therewith also the in- and outlet devices, are put out of level, the floating body with its distribution holes will always keep a levelled stable position on the water phase of the shaft, as it is without contact with the fixedly installed devices for in- and outlet. The bottom of the water distributing basin is formed so that it can compensate hydrologically for slantingly installed inlets, which takes place when the distribution shaft becomes subject to greater angle deviations. Thus, preferably the basin bottom has a downward concave shape. Also, the bottom of the distribution shaft is formed so that it creates an evenly distributed "splash-effect", resulting in an improved effect of infiltration pipes and ditches. This distribution shaft with its floating body compensates for as much as 15 degrees of angle deviation of the shaft or tank in all direction.

The invention will be explained more closely in the following description with reference to an exemplary embodiment illustrated in the drawings.

DETAILED DESCRIPTION OF THE PREFERRED EMBODIMENT

Figure 1:
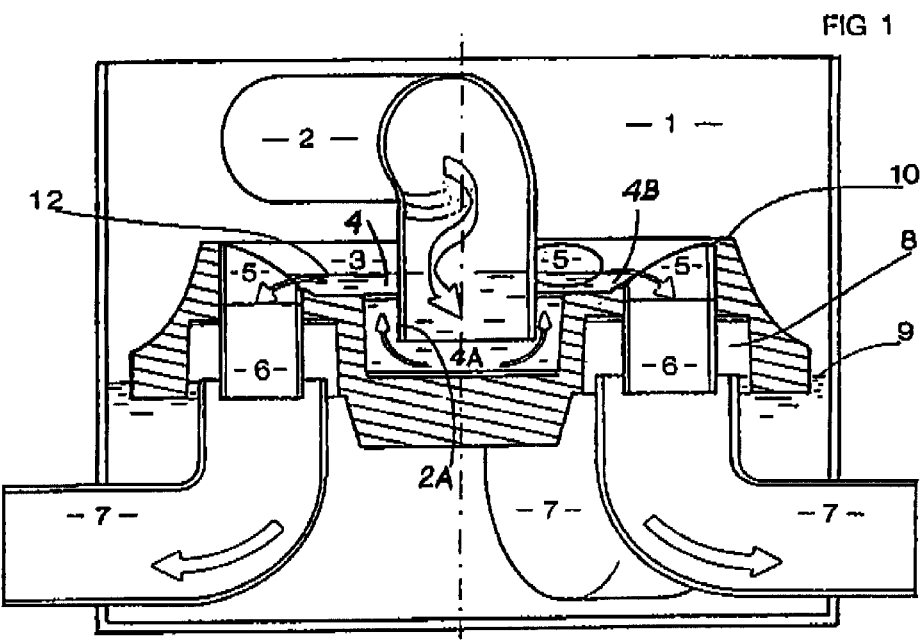
FIG. 1 shows the distribution shaft in vertical cross section after the line a-b on FIG. 2. The arrows indicate the direction in which the water runs.

The water is fed to the shaft 1 through the inlet 2 which is sunk into the water distribution basin 4 of the floating body 3 The number 12 shows the water level in the water distribution basin. From basin 4 water runs radially out to, and down through, the distribution holes 5. These have a pipe connection 6 which is situated internally in the elbow of the outlet pipe 7 and ensures that the water is led further down into the elbow. Around the pipe connection 6 there are in the horizontal plane larger circular recesses or openings 8, so that the inlet to the elbow 7 of the outlet pipe can extend up within the floating body 3. Thus, the water level in the shaft 1 is determined by the lowermost elbow 7 or the outlet pipe. Together with the "headroom" in the circular openings 8, the elbow determines which position the floating body 3 can occupy before it touches the ceiling in one or more of the circular openings 8 and thereby losing its capacity for automatic water distribution. These parameters determine the capacity for angle deviations, with the limitation that the floating body 3 ought to be very stable, and to obtain that the limitation has to be larger than heigh:width approx. 1:2.

The distribution holes 5 can in their lower edge have an approximate V-shaped inlet cross section, as known per se. The floating body should be smaller than the inner diameter of the shaft 1. Likewise, there must be sufficient clearance to the pipe connections to secure free movement. The circular surrounding wall or elevation 10 ensures that the water is led to the distribution holes 5. If desired, the inlet 2 and the floating body 3 can be lifted from their assembled positions as shown, after removal of a cover (not shown) on top of the shaft or tank 1. Condensation of water on the inside of the shaft provides sufficient water for the movement of the floating body 3. For reasons of balance an extra circular opening 8 below the inlet 2 is connected with a ventilation opening 11. This leads out through the circular elevation 10 to avoid variations in pressure. The water level 12 in the water distribution basin 4 varies somewhat with the volume of the induced water, and ensures rinsing of the slanting sides in the floating body 3.

Although the above description refers to a particular embodiment according to the invention, it will be understood that various modifications and specific solutions are possible. Whereas, e.g., water has been mentioned as the liquid or liquids involved, also liquids different from water may be of interest in connection with the distribution shaft or tank. This not only relates to the liquid flowing through the tank, but also the reservoir contained in the tank for supporting the float body, may be some other specific liquid than water. The particular field of use will determine what sort of liquid will be involved, such as for installations in industrial processing plants.

Figure 2:
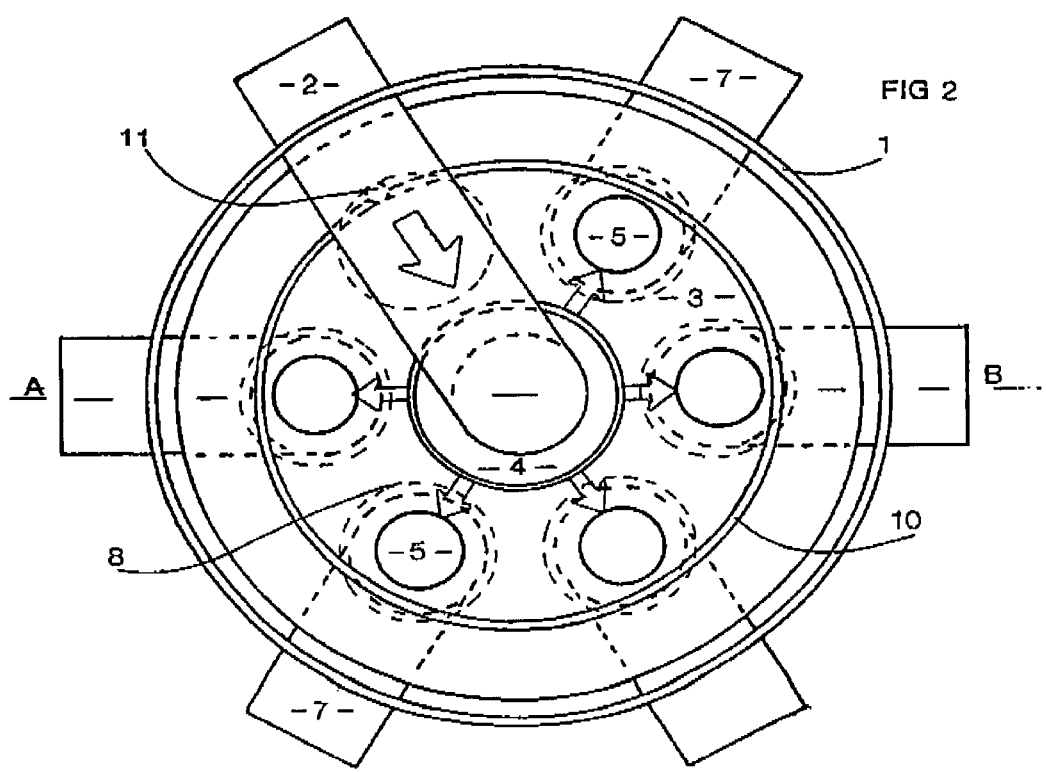
FIG. 2 shows the water distribution shaft seen from above. Dotted lines indicate pipes and cavities, invisible from the top; the arrows illustrate the direction in which the water runs. The process of the operation is explained by reference to the numbers which are noted on the drawing.

As regards the relative dimensions and positions of components incorporated in the tank, a primary concern is that the float body shall be able to float freely on the surface of the reservoir liquid, so as to automatically assume a level or horisontal position at any time. Thus the float body preferably has an outer contour running at a small distance from, but with sufficient clearance in relation to adjacent inner walls of the tank. Another feature related to the freedom of movement of the float body in relation to the stationary tank walls and other fixed components therein, will be seen in the relatively deep central part 4A of the distribution basin 4, in which the inlet pipe 2 is immersed, as illustrated in FIG. 1. This solution besides will provide for a water lock effect. At this point it is noted that the bottom of the central part 4A is shown to be more or less planar in FIG. 1. As indicated above a more hydrologically favourable shape may be contemplated, in particular by having a downward curvature of this bottom, so that any skewing of inlet pipe 2 with respect thereto will not result in an undesired flow pattern in this central part of the distribution basin. In FIGS. 1 and 2 five outlets are shown, these being in the principle regularly distributed around the circumference. The balanced arrangement thereby established, will be obtained in a corresponding manner when a different number of outlets are provided for, e.g. three outlets having a mutual angular spacing of 120°.

What is claimed is:

1. An apparatus for the distribution of water or other liquids, comprising a tank with at least one inlet and two or more outlets adapted to deliver equal amounts of liquid, a float body adapted to float on a water reservoir in the tank, and a distribution basin for receiving liquid from said inlet(s), said distribution basin having a number of outlet openings corresponding to said outlets and located at the same level in the distribution basin, wherein each of said outlet openings is adapted to discharge liquid to a separate outlet.

2. The apparatus according to claim 1, wherein the float body has an outer contour running at a small distance from, but with sufficient clearance in relation to adjacent inner walls of the tank.

3. The apparatus according to claim 1, wherein the distribution basin has a central part adapted to receive liquid from the inlet, and a surrounding part where the outlet openings are located.

4. The apparatus according to claim 3, wherein the central part is relatively deep and the surrounding part is relatively shallow.

5. The apparatus according to claim 4, wherein the inlet comprises a substantially vertical pipe the end of which is adapted to be immersed in liquid in the central part.

6. The apparatus according to claim 3, wherein the bottom of the central part has a downward concave shape.

7. The apparatus according to claim 1, wherein the outlets comprise upper ends serving as overflows for determining a maximum level of the reservoir.

8. The apparatus according to claim 7, wherein the outlet openings are provided with vertically extending pipe connections cooperating with said upper ends of the outlets in a telescopic manner.

9. The apparatus according to claim 1, wherein the float body is made of a non-absorbent material and has a resistant surface with respect to the liquid concerned.

10. The apparatus according to claim 3, wherein the outlet openings are located in a balanced or regularly distributed arrangement in relation to the central part.

11. The apparatus according to claim 4, wherein the distribution basin has a rising slope from the central part to the surrounding part, towards the outlet openings.

* * * * *